United States Patent
Chipper

Patent Number: 5,852,516
Date of Patent: Dec. 22, 1998

[54] DUAL PURPOSE INFRARED LENS ASSEMBLY USING DIFFRACTIVE OPTICS

[75] Inventor: Robert B. Chipper, Allen, Tex.

[73] Assignee: Raytheon TI Systems, Inc., Lewisville, Tex.

[21] Appl. No.: 786,945

[22] Filed: Jan. 23, 1997

Related U.S. Application Data

[60] Provisional application No. 60/012,770, Mar. 4, 1996.

[51] Int. Cl.⁶ .......................... G02B 15/14; G02B 13/14; G02B 5/18
[52] U.S. Cl. .......................... 359/676; 359/354; 359/357; 359/558; 359/684
[58] Field of Search ................... 359/676–692, 359/354, 356–357, 563–566, 558

[56] References Cited

U.S. PATENT DOCUMENTS

| | | | |
|---|---|---|---|
| 3,825,315 | 7/1974 | Altman et al. | 250/349 |
| 3,846,820 | 11/1974 | Lampe et al. | 257/443 |
| 3,947,084 | 3/1976 | Noyes | 359/354 |
| 4,007,978 | 2/1977 | Holton | 385/14 |
| 4,018,608 | 4/1977 | Frazier | 430/348 |
| 4,067,641 | 1/1978 | Holton | 385/131 |
| 4,080,532 | 3/1978 | Hopper | 250/332 |
| 4,084,130 | 4/1978 | Holton | 372/50 |
| 4,085,550 | 4/1978 | Graham | 451/308 |
| 4,142,207 | 2/1979 | McCormack et al. | 348/165 |
| 4,143,402 | 3/1979 | McCormack et al. | 250/352 |
| 4,162,402 | 7/1979 | Hopper | 250/332 |
| 4,205,227 | 5/1980 | Reed | 250/330 |
| 4,275,302 | 6/1981 | Imbert et al. | 250/330 |
| 4,379,232 | 4/1983 | Hopper | 250/332 |
| 4,411,488 | 10/1983 | Neil | 359/354 |
| 4,411,732 | 10/1983 | Wotherspoon | 204/192.34 |
| 4,431,917 | 2/1984 | Gibbons | 250/332 |
| 4,447,291 | 5/1984 | Schulte | 438/704 |
| 4,594,507 | 6/1986 | Elliott et al. | 250/331 |
| 4,614,957 | 9/1986 | Arch et al. | 257/188 |
| 4,615,595 | 10/1986 | Hornbeck | 353/122 |
| 4,621,888 | 11/1986 | Crossland et al. | 359/357 |
| 4,639,756 | 1/1987 | Rosbeck et al. | 257/442 |
| 4,684,812 | 8/1987 | Tew et al. | 250/578 |
| 4,705,361 | 11/1987 | Frazier et al. | 359/263 |
| 4,710,732 | 12/1987 | Hornbeck | 359/291 |
| 4,751,387 | 6/1988 | Robillard | 250/331 |
| 4,877,317 | 10/1989 | Gibbons et al. | 359/421 |
| 4,948,976 | 8/1990 | Baliga et al. | 250/370.06 |
| 4,956,619 | 9/1990 | Hornbeck | 359/317 |
| 4,965,649 | 10/1990 | Zanio et al. | 257/442 |
| 4,994,672 | 2/1991 | Cross et al. | 250/330 |
| 5,010,251 | 4/1991 | Grinberg et al. | 250/332 |
| 5,021,663 | 6/1991 | Hornbeck | 250/349 |
| 5,047,644 | 9/1991 | Meissner et al. | 250/332 |
| 5,051,591 | 9/1991 | Trotta et al. | 250/351 |
| 5,061,049 | 10/1991 | Hornbeck | 359/224 |

(List continued on next page.)

FOREIGN PATENT DOCUMENTS

| | | |
|---|---|---|
| 939943 | 1/1974 | Canada. |
| 2 251 952 | 7/1992 | United Kingdom. |
| WO 91/16607 | 10/1991 | WIPO. |

*Primary Examiner*—Georgia Y. Epps
*Assistant Examiner*—Jordan M. Schwartz
*Attorney, Agent, or Firm*—Baker & Botts, L.L.P.

[57] ABSTRACT

An infrared zoom lens assembly (16) operative as either a continuous zoom or a two-position zoom lens. The infrared zoom lens assembly (16) includes a focusing component (33), a collecting component (37) and a diffracting component (41). The focusing component (33) includes a first focusing zoom lens (34) positioned at the same location at the ends of the zoom range and a second focusing zoom lens (36) movably mounted in the infrared zoom lens assembly (16). The diffracting component (41) may be used to correct color aberrations associated with an infrared waveband. The focusing component (33) and the collecting component (37) cooperate with the diffracting component (41) to focus infrared radiation at an image plane (15) of an infrared detector (18).

20 Claims, 3 Drawing Sheets

U.S. PATENT DOCUMENTS

| | | | |
|---|---|---|---|
| 5,083,857 | 1/1992 | Hornbeck | 359/291 |
| 5,113,076 | 5/1992 | Schulte | 250/370.06 |
| 5,132,848 | 7/1992 | Nishio et al. | 359/686 |
| 5,144,138 | 9/1992 | Kinch et al. | 250/332 |
| 5,188,970 | 2/1993 | York et al. | 438/59 |
| 5,196,703 | 3/1993 | Keenan | 250/332 |
| 5,229,886 | 7/1993 | Tanaka | 359/683 |
| 5,238,530 | 8/1993 | Douglas et al. | 216/62 |
| 5,264,326 | 11/1993 | Meissner et al. | 430/313 |
| 5,268,790 | 12/1993 | Chen | 359/684 |
| 5,313,331 | 5/1994 | Mihara | 359/687 |
| 5,346,532 | 9/1994 | Sinclair et al. | 75/744 |
| 5,424,869 | 6/1995 | Nanjo | 359/687 |
| 5,493,441 | 2/1996 | Chipper | 359/354 |
| 5,504,628 | 4/1996 | Borchard | 359/796 |
| 5,559,332 | 9/1996 | Meissner et al. | 250/338.2 |

DUAL PURPOSE INFRARED LENS ASSEMBLY USING DIFFRACTIVE OPTICS

This application claims priority under 35 U.S.C. § 119 (e) (1) of provisional application Ser. No. 60/012,770, filed Mar. 4, 1996.

RELATED APPLICATION

This application is related to U.S. Pat. No. 5,493,441 issued Feb. 20, 1996 entitled "INFRARED CONTINUOUS ZOOM TELESCOPE USING DIFFRACTIVE OPTICS" (Attorney's Docket TI-18178); copending U.S. patent application Ser. No. 08/788,070 filed Jan. 23, 1997 entitled "DUAL BAND INFRARED LENS ASSEMBLY USING DIFFRACTIVE OPTICS" (Attorney's Docket TI-20843); copending U.S. patent application Ser. No. 08/786,944 filed Jan. 23, 1997 entitled "WIDE FIELD OF VIEW INFRARED ZOOM LENS HAVING A CONSTANT F/NUMBER" (Attorney's Docket TI-21132); and copending U.S. patent application Ser. No. 08/786,957 filed Jan. 23, 1997 entitled "INFRARED ZOOM LENS ASSEMBLY HAVING A VARIABLE F/NUMBER" (Attorney's Docket TI-21133).

TECHNICAL FIELD OF THE INVENTION

This invention relates generally to optical systems, and more particularly to a dual purpose infrared lens assembly using diffractive optics.

BACKGROUND OF THE INVENTION

Infrared or thermal imaging systems typically use a plurality of thermal sensors to detect infrared radiation and produce an image capable of being visualized by the human eye. Thermal imaging systems typically detect thermal radiance differences between various objects in a scene and display these differences in thermal radiance as a visual image of the scene. Thermal imaging systems are often used to detect fires, overheating machinery, planes, vehicles and people, and to control temperature sensitive industrial processes.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium. A chopper is often included in a thermal imaging system to modulate the infrared radiation and to produce a constant background radiance which provides a reference signal. The electronic processing portion of the thermal imagining system will subtract the reference signal from the total radiance signal to produce a signal with minimum background bias.

Thermal imaging systems may use a variety of infrared detectors. An infrared detector is a device that responds to electromagnetic radiation in the infrared spectrum. Infrared detectors are sometimes classified into two main categories as cooled and uncooled. A cooled infrared detector is an infrared detector that must be operated at cryogenic temperatures, such at the temperature of liquid nitrogen, to obtain the desired sensitivity to variations in infrared radiation. Cooled detectors typically employ thermal sensors having small bandgap semiconductors that generate a change in voltage due to photoelectron interaction. This latter effect is sometimes called the internal photoelectric effect.

Uncooled infrared detectors cannot make use of small bandgap semiconductors because dark current swamps any signal at room temperature. Consequently, uncooled detectors rely on other physical phenomenon and are less sensitive than cooled detectors. However, because uncooled detectors do not require the energy consumption of cooled detectors, they are the preferred choice for portable, low power, applications where the greater sensitivity of cooled detectors is not needed. In a typical uncooled thermal detector, infrared photons are absorbed and the resulting temperature difference of the absorbing element is detected. Thermal detectors include a pyroelectric detector, a thermocouple, or a bolometer.

An infrared window is a frequency region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption of the same.

Infrared radiation is generally focused onto a thermal detector by one or more infrared lens. Infrared lenses may be classified as a single field of view lens or as a zoom lens. Zoom lenses, in turn, may be designed to function as a continuous zoom lens or as a two-position zoom lens. Such customization of zoom lenses, however, is expensive, requiring separate lens systems to be designed and fabricated for use in continuous and two-position zoom applications.

SUMMARY OF THE INVENTION

In accordance with the present invention, a dual purpose infrared lens assembly using diffractive optics is provided that substantially eliminates or reduces the disadvantages and problems associated with prior infrared detection systems.

In accordance with the present invention, an infrared lens assembly is provided with a plurality of components located along an optical axis to focus infrared radiation of an object. A focusing component includes a first focusing zoom lens and a second focusing zoom lens. The first focusing zoom lens may be located along the optical axis at a first location when the zoom lens assembly is at a first zoom position and a second zoom position. The second focusing zoom lens may be movably mounted in the infrared zoom lens assembly. A collecting component includes at least one collecting lens. A diffracting component includes at least one diffractive surface that may be employed to correct color aberrations associated with an infrared waveband. The focusing and collecting components cooperate with the diffractive components to focus infrared radiation of the object onto an image plane of an associated infrared detector.

More specifically, the first zoom position may be a retracted zoom position. The second zoom position may be an extended zoom position. Additionally, the first zoom position may be 8° while the second zoom position is 24°. Alternatively, the first zoom position may also be 15° while the second zoom position is 40°.

In accordance with another aspect of the present invention, an aperture stop may be mounted on a movably mounted lens. The aperture stop is operable vary the F/Number of the zoom lens assembly between the first and the second zoom positions. The movably mounted lens upon which the aperture stop is mounted may be the second focusing zoom lens.

Important technical advantages of the present invention include providing an infrared zoom lens assembly operable as either a continuous zoom or a two-position zoom lens. Another important technical advantage of the present invention includes providing a relatively low cost infrared zoom lens assembly. In particular, separate infrared zoom lens assemblies need not be designed and fabricated for use as continuous and two-position zoom lenses. Additionally, mounting the aperture stop on a movable lens allows an increase in performance in the wide field of view, F-number less than 1.0, while minimizing the lens diameters of the focussing component. Thus, the present invention provides a low cost infrared zoom lens assembly by eliminating the cost of designing and fabricating different lens assemblies to operate in continuous and two-position zoom applications.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
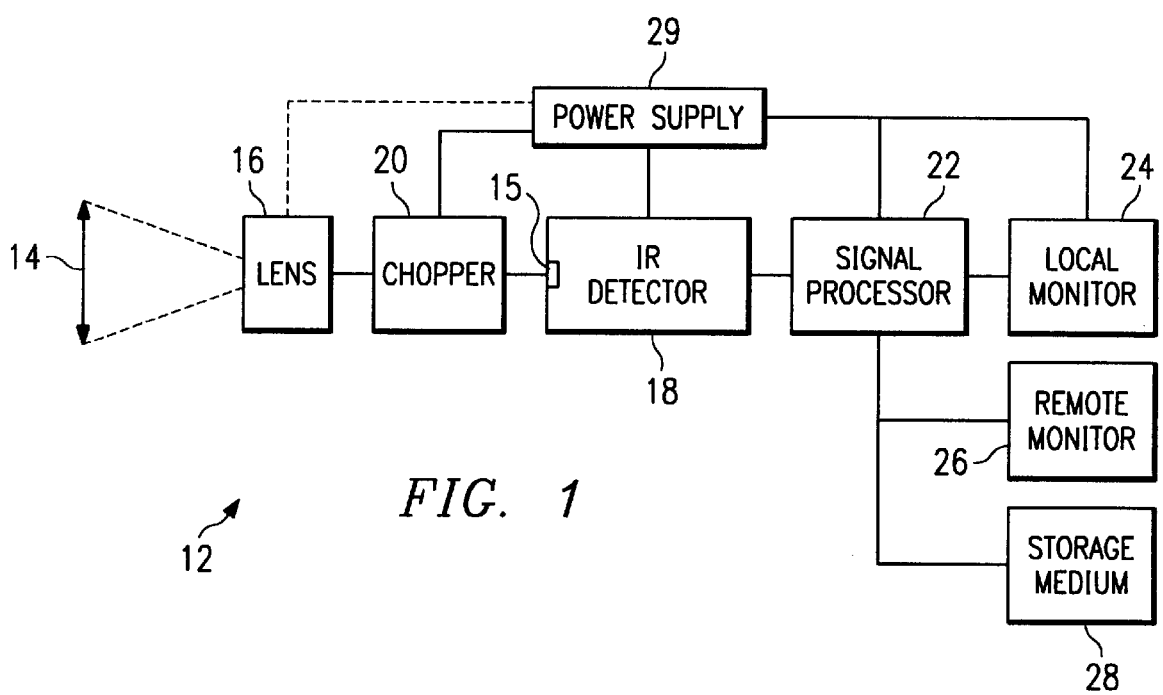
FIG. 1 is a block diagram of an infrared imaging system with a dual purpose lens assembly using diffractive optics in accordance with one aspect of the present invention.

The preferred embodiments of the present invention and its advantages are best understood by referring now in more detail to FIGS. 1–3 of the drawings, in which like numerals refer to like parts throughout the several views. FIG. 1 shows a schematic block diagram of an infrared imaging system 12 for detecting, processing, and displaying the heat image of an object 14. The infrared imaging system 12 may be used to detect fires, overheating machinery, planes, vehicles and people, and to control temperature sensitive industrial processes.

As shown by FIG. 1, the infrared imaging system 12 comprises a zoom lens assembly 16 in optical communication with an infrared detector 18. The infrared detector 18 senses infrared radiation, typically, in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption.

The zoom lens assembly 16 focuses or directs infrared radiation emitted by the object 14 onto an image plane 15 of the infrared detector 18. In cases where an uncooled detector 18 is used, a chopper 20 is often disposed between the lens assembly 16 and the infrared detector 18. The chopper 20 may be controlled by a signal processor 22 to periodically interrupt transmission of the infrared image to the image plane 15 of the infrared detector 18. The chopper 20 may be a rotating disk with openings that periodically block and let pass infrared radiation.

The infrared detector 18 translates incoming infrared radiation into one or more images and corresponding electrical signals for processing. Electrical signals are fed to the signal processor 22, which assembles electrical signals into video signals for display. As previously described, the signal processor 22 may also synchronize operation of the chopper 20. This synchronization enables the signal processor 22 to subtractively process incoming infrared radiation to eliminate both fixed infrared background radiation and time constant noise. The output of the signal processor 22 is often a video signal that may be viewed, further process, stored, or the like.

The video signal may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the infrared imaging system 12 may be provided by a power supply 29. The power supply 29 provides electrical power directly to the chopper 20, the infrared detector 18, the signal processor 22, and to the local monitor 24. Electrical power may also be provided to the zoom lens assembly 16, when, for example, a motor is employed to zoom the lens assembly 16.

Figure 2A:
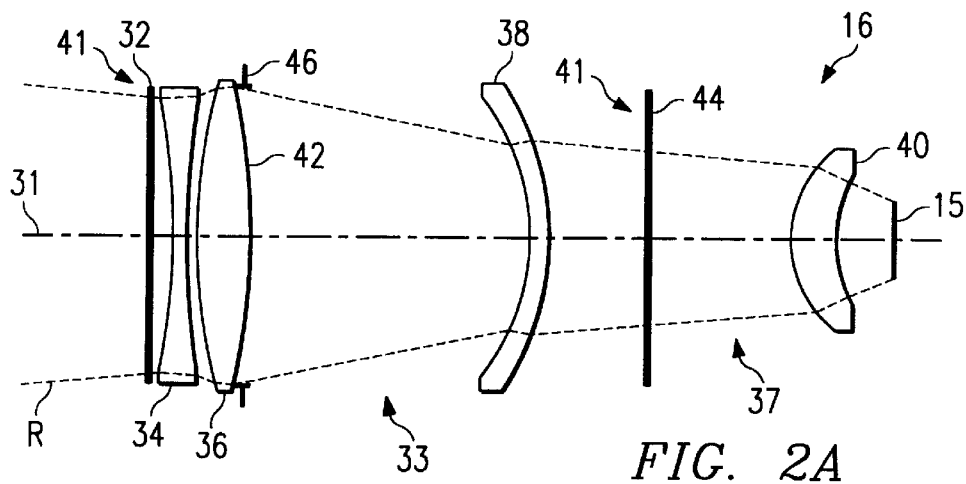
FIGS. 2A–C are schematic drawings of the dual purpose lens assembly of FIG. 1.
Figure 2B:
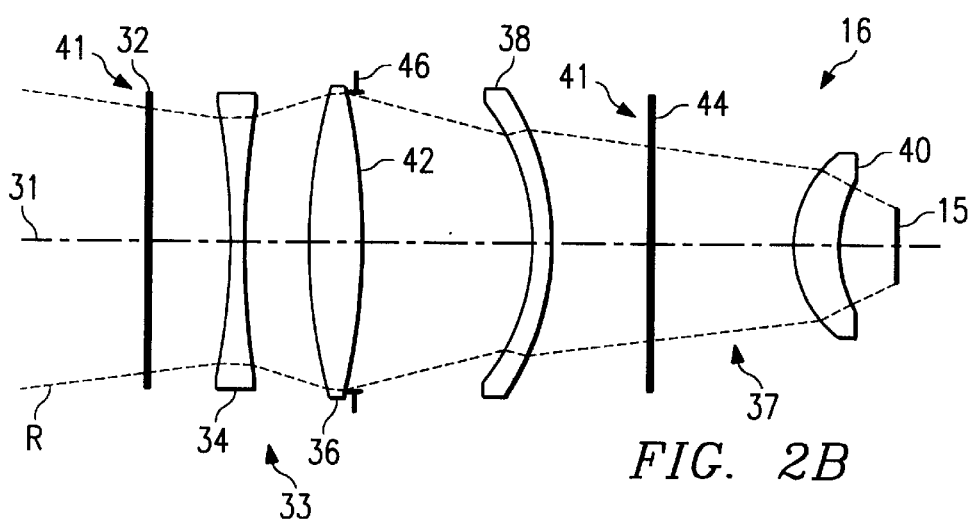
Figure 2C:
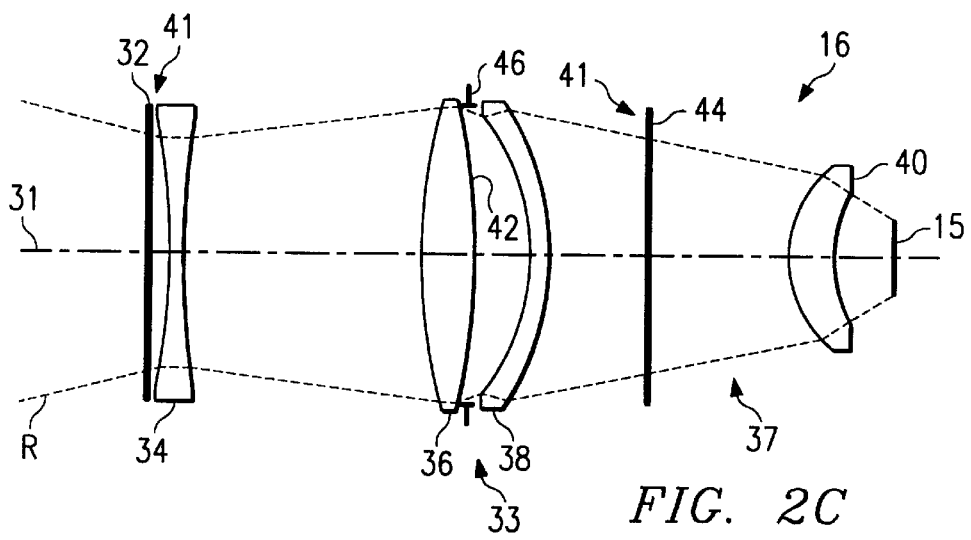
Figure 3A:
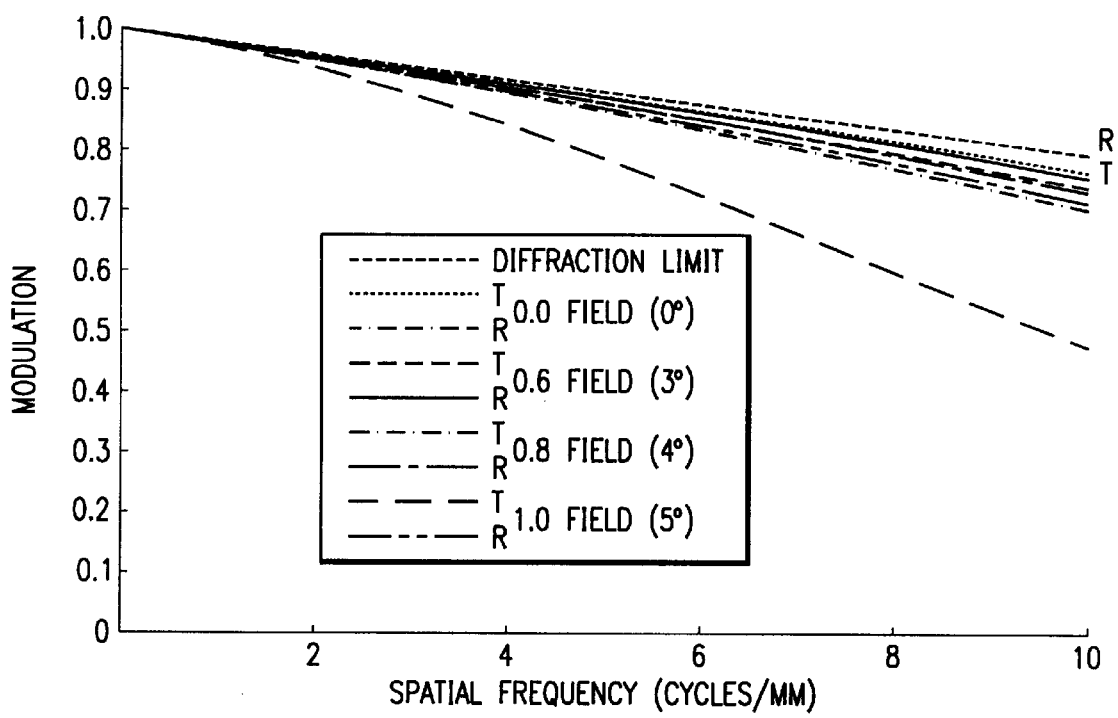
FIGS. 3A–B are frequency drawings of the dual purpose lens assembly of FIGS. 2A–C, showing modulation transfer function performance of the lens, which is a measure of contrast, versus spatial frequency.
Figure 3B:
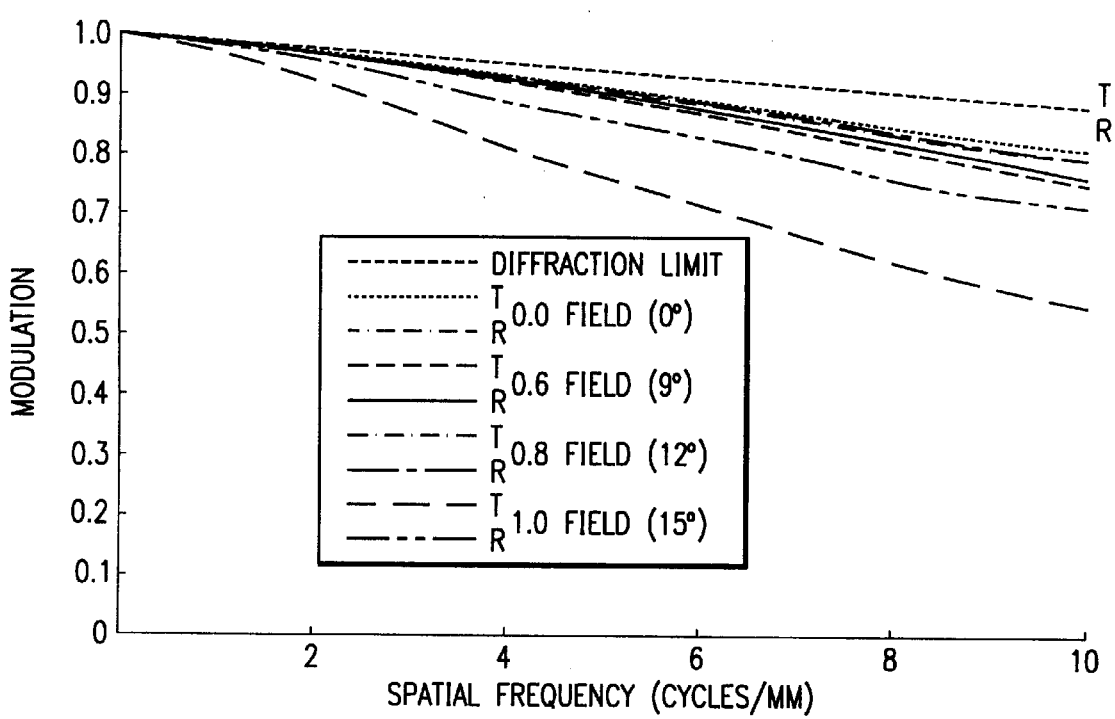

FIGS. 2A–C are schematic drawings of the zoom lens assembly 16 incorporating an embodiment of the present invention. In this embodiment, zoom lens assembly 16 may be generally described as a zoom lens having a retracted position shown in FIG. 2A, an intermediate zoom position shown in FIG. 2B, and an extended position shown in FIG. 2C. Preferably, zoom lens assembly 16 is approximately 191 millimeters in overall length and operable over a horizontal field of view of eight to twenty-four degrees (8°–24°) and yielding a 3:1 zoom ratio with a 4:3 aspect ratio. If desired, the operable horizontal field of view may be fifteen to forty degrees (15°–40°). Graphs of the performance of the zoom lens assembly 16 verses spacial frequency are shown for the retracted zoom position in FIG. 3A and for the extended zoom position in FIG. 3B.

As shown by FIGS. 2A–C, the various components of the zoom lens assembly 16 are positioned along an optical axis 31. Zoom lens assembly 16 comprises a focusing component 33 including a pair of zoom lenses 34 and 36. A collecting component 37 includes a pair of fixed collecting lenses 38 and 40. A diffracting component 41 includes a diffractive surface 42 and a diffractive lens 44. A protective window 32 may also be provided to prevent dust and other elements from entering and damaging the zoom lens assembly 16.

In accordance with conventional practice, the radius of curvature of the lens elements will be defined as positive if the center of curvature lies to the right of the lens element and will be defined as negative if the center of curvature lies to the left of the lens element along optical axis 31. A lens element will be defined as converging if the lens focusing power causes parallel light rays to converge, and will be defined as diverging if the lens focusing power causes parallel light rays to appear to originate from a virtual focus. Further, a side of a lens will be defined as a first side if facing the object 14 and will be defined as a second side if facing the image plane 15.

For the embodiment of FIGS. 2A–B, focusing zoom lens 34 is a negative diverging lens while focusing zoom lens 36 is a positive converging lens. As described below in detail, focusing zoom lens 34 may be fixably or movably installed in lens assembly 16. Focusing zoom lens 36 is movably installed in lens assembly 16 and moves relative to focusing zoom lens 34 in a nonlinear fashion. Collecting lens 38 is a negative diverging lens while collecting lens 40 is a positive converging lens. Focusing zoom lenses 34 and 36 and collecting lenses 38 and 40 cooperate with diffractive surface 42 and diffractive lens 44, which are discussed below in detail, to focus infrared radiation emitted by object 14 onto the image plane 15 of the infrared detector 18. Preferably, infrared detector 18 is an uncooled detector for use in connection with zoom lens assembly 16.

A significant feature of the present invention is the configuration of the zoom lens assembly 16 such that focusing zoom lens 34 is located at precisely the same location for a first and a second zoom position. The first zoom position may be the retracted zoom position. The second zoom position may be the extended zoom position. This configuration allows focusing zoom lens 34 to be fixably mounted in that location for a two-position zoom application or to be movably mounted for a continuous zoom application. Thus, the present invention provides a single lens design that can be used either as a continuous zoom lens or a two-position zoom lens.

For continuous zoom applications, focusing zoom lens 34 may be movably mounted in zoom lens assembly 16. In such an embodiment, zoom lenses 34 and 36 move relative to each other in a nonlinear fashion. As best shown by comparison of FIGS. 2A–C, as zoom lens assembly 16 is zoomed, focusing zoom lens 34 moves away from its initial location (FIG. 2A) toward an intermediate location (FIG. 2B) and then backtracks to the initial location (FIG. 2C). Thus, focusing zoom lens 34 occupies the same location when zoom lens assembly 16 is fully retracted or is fully extended, but otherwise moves during zooming operations to keep object 14 in focus. As also best shown by comparison of FIGS. 2A–C, as zoom lens assembly 16 is zoomed, focusing zoom lens 36 moves from an initial location toward collecting lens 38.

For two-position zoom applications, focusing zoom lens 34 may be fixedly mounted in zoom lens assembly 16. In such an embodiment, focusing zoom lens 36 is preferably mounted proximate to window 32. Accordingly, during zooming operations, focusing zoom lens 34 remains stationary. Focusing zoom lens 36, as discussed above for continuous zoom applications, moves toward collecting lens 38. Because focusing zoom lens 34 does not move during zooming operations, zoom lens assembly 16 only focuses in the retracted and the extended positions.

Thus, zoom lens assembly 16 can be configured as a continuous zoom lens or as a two-position zoom lens by simply fixing focusing zoom lens 34 in its initial position or by allowing it to move during zooming operations. The size, shape, and operation of the remaining lens elements need not be altered between the continuous and two-position zoom configurations. Therefore, in accordance with the present invention, a single infrared lens assembly can be designed and fabricated for use as both a continuous zoom lens and a two-position zoom lens.

An aperture stop 46 may be mounted on a second side of zoom focusing lens 36. The aperture stop 46 determines the diameter of the cone of energy that the zoom lens assembly 16 will accept by limiting the passage of infrared energy through the lens. The cone of energy that the zoom lens assembly 16 will accept is shown by ray trace R.

The aperture stop 46 moves with zoom focusing lens 36, causing the F/Number of the lens assembly 16 to vary over the zoom range. This allows greater sensitivity in the wider fields of view. Also, the variable F/Number allows the diameter of the zoom focusing lenses to be minimized. For the embodiment shown in FIGS. 2A–C, the F/Number changes from approximately 1.6 to 0.9 through the zoom range.

The zoom focusing lenses 34 and 36 and the collecting lenses 38 and 40 may be constructed of a single material having infrared transmitting properties that change minimally between the near and far infrared wavebands. This construction will allow the zoom lens assembly 16 to be used in both the near and the far infrared wavebands.

The material may be a glass or a similar type of infrared transmitting material having a high dispersion rate and a low refractive index. The refractive index of a material is the ratio of the speed of light in a vacuum (essentially the same as in air) to the speed of light in the material. The dispersion rate of a material is the rate of change of the refractive index of the material with respect to a wavelength. The dispersion rate may be expressed as an Abbe V-number, which is a measure of the reciprocal relative dispersion. Thus, a high dispersion rate corresponds to a low Abbe V-number and visa-versa. As used herein, the phrase "low refractive index" means a refractive index of less than 3.3. The phrase "high dispersion rate," as used herein, means an Abbe V-number of less than 200.

Materials having a high dispersion rate and a low refractive index include Gallium Arsenide (GaAs) and chalcogenide glass, such as TI 1173 manufactured by Texas Instruments Incorporated. Germanium, which is often the preferred material for far infrared lenses, has a low dispersion rate in the far infrared band and a high refractive index. Germanium is preferred in other infrared lens applications because lenses having a high refractive index need less curvature than lenses with a lower refractive index. Thus, use of a high index material makes it is easer to correct for image aberrations such as spherical, coma, and astigmatism.

The properties of TI 1173, Gallium Arsenide, and Germanium in the near and far infrared bands are listed below in Table 1. In Table 1, the Abbe V-number is a measure of the reciprocal relative dispersion of the material.

TABLE 1

|  | INDEX | | ABBE V-NUMBER | |
| --- | --- | --- | --- | --- |
|  |  |  | Far Infrared | Near Infrared |
| Material | 10 Micron | 4 Micron | Band | Band |
| TI1173 | 2.604 | 2.622 | 108 | 169 |
| GaAs | 3.278 | 3.307 | 108 | 146 |
| Ge | 4.003 | 4.025 | 991 | 102 |

From Table 1, for a high dispersion, low index material such as TI 1173, the properties change very little between the near and far infrared wavebands. Accordingly, the zoom lens assembly 16 is equally applicable to the near and far infrared bands.

As previously discussed, low index materials, such as TI 1173, have a reduced capacity to bend light. To compensate, the lens elements of zoom lens assembly 16 have larger curvatures than would otherwise be used. Consequently, it may be more difficult to reduce image degrading aberrations, such as spherical, coma, and astigmatism. To reduce such image degrading aberrations, zoom focusing lenses 34 and 36 and collecting lenses 38 and 40 include aspheric surfaces. The general equation for an aspheric surface is:

$$Z = \frac{(CC)Y^2}{1 + [1 - (1+K)(CC)^2 Y^2]^{1/2}} + AY^4 + BY^6 + CY^8 + DY^{10}$$

where: Z is Sag value along the z-axis;
Y is the semi-diameter height;
CC is the base curvature 1/radius) of the surface
K is the conic coefficient; and
A, B, C and D are the 4th, 6th, 8th and 10th order aspheric coefficients, respectively.

The coefficients of the aspheric surfaces of zoom focusing lenses 34 and 36 and collecting lenses 38 and 40 are listed below in Table 2.

Zoom lens assembly 16 may be passively athermalized by mounting collecting lens 40 against a plastic spacer (not shown). The spacer expands and contracts with temperature changes in relation to the change of the refractive index of the lens elements. Thus, as the temperature changes, and the refractive index of the lens elements change, the spacer expands or contracts to position the collecting lens 40 to where it accounts for the change in refractive index of the lenses.

Diffractive surface 42 may be formed on a second side of zoom focusing lens 36. Diffractive lens 44 comprises an infrared transmitting material having a diffractive surface. The diffractive surfaces may each be a kinoform produced by diamond point turning, patterned and etched, or the like. Kinoforms are diffractive elements whose phase modulation is introduced by a surface relief pattern. The diffractive optical surface results in a step function whose surface is cut back by precisely one wavelength of the light frequency of interest, preferably 4 microns for the near infrared band and 10 microns for the far infrared band, every time their thickness increases by that amount. The general equation for a diffractive surface is:

TABLE 2

ASPHERIC SURFACE COEFFICIENTS

|  | Zoom Lens 34 | Zoom Lens 36 | Collecting Lens 38 | Collecting Lens 40 |
|---|---|---|---|---|
| Curvature (CC) | | | | |
| Surface 1 | −.127137 | .178410 | −.430669 | .986291 |
| Surface 2 | .091401 | −.148557 | −.316150 | .848162 |
| Aspheric Coefficients | | | | |
| K S1 | 0 | 0 | 0 | 0 |
| A4 S1 | .201379E−2 | −.35445E−2 | .170040E−2 | .755033E−1 |
| A6 S1 | .923141E−3 | .82051E−4 | .100440E−2 | −.114781E+0 |
| A8 S1 | −.542057E−3 | −.22544E−4 | .230532E−2 | .406281E+0 |
| A10 S1 | .777427E−4 | −.10803E−4 | −.844101E−3 | −.138529E+0 |
| K S2 | | | | |
| A4 S2 | 0 | 0 | 0 | 0 |
| A6 S2 | −.289036E−3 | .263336E−2 | −.121339E−1 | .298021E+0 |
| A8 S2 | .967638E−3 | −.339406E−3 | .285494E−2 | −.101330E+2 |
| A10 S2 | −.532725E−3 | .562042E−4 | .756956E−3 | .463535E+1 |
| | .771300E−4 | −.201318E−4 | −.436482E−3 | −.593470E+1 |

The aspheric surfaces of the lens elements may be formed by press molding or by grinding operations. Further information concerning molding of the lens elements is disclosed by commonly assigned U.S. Pat. No. 5,346,523, entitled "METHOD OF MOLDING CHALCOGENIDE GLASS LENSES." Shaping of lenses is well known in the art and therefore will not be further described.

A chalcogenide glass, such as TI 1173, generally has a low DN/DT (delta refractive index/delta temperature) value, which is the rate of change of a material's refractive index with changes in temperature. If a chalcogenide glass or other material having a low DN/DT value is used to construct the lens elements, lens assembly 16 may be passively athermalized. That is, constructed to hold focus with changes in temperature without aid of a motor or similar device.

$$Z = \frac{(CC)Y^2}{1 + \text{SQRT}[1 - (1+K)(CC)^2 Y^2]} + AY^4 + BY^6 + CY^8 + DY^{10} +$$

$$[HOR] * \left( \frac{C1Y^2 + C2Y^4 + C3Y^6}{(N1 - N2)} - \frac{\lambda}{N1 - N2} * \right.$$

$$\left. INT \frac{[C1Y^2 + C2Y^4 + C3Y^6]}{\lambda} \right)$$

where: Z is Sag value along the Z-axis or optical axis;
Y is the semi-diameter height;
CC is the base curvature (1/radius) of the surface;
K is the conic coefficient of surface;
A,B,C, and D are the 4th, 6th, 8th and 10th order aspheric coefficients, respectively;
HOR is the diffraction order, generally 1 or −1;

λ is the design wavelength for surface;

N1 is the Refractive index of material preceding diffractive surface;

N2 is the Refractive index of material following diffractive surface; and

C1, C2, and C3 are coefficients for describing aspheric phase departure.

The diffractive kinoform surface coefficients of diffractive lenses 42 and 44 are listed below in Table 3.

TABLE 3

DIFFRACTIVE KINOFORM SURFACE COEFFICIENT

| Parameter | Diffractive Surface 42 | Diffractive Lens 44 |
|---|---|---|
| HOR | −1 | −1 |
| λ (inches) | 4 e-4 | 4 e-4 |
| N1 | 1.0 | 1.5 |
| N-2 | 2.6 | 1.0 |
| CC (inches) | .17841 | 0 |
| K | 0 | 0 |
| A | −3.5445E−03 | 0 |
| B | 8.2051E−05 | 0 |
| C | −2.2544E−05 | 0 |
| D | −1.0803E−05 | 0 |
| C1 | 1.6760E−03 | 6.4923E−03 |
| C2 | 0 | 0 |
| C3 | 0 | 0 |

Further information concerning kinoform diffractive surfaces is disclosed by commonly assigned U.S. patent application Ser. No. 08/181,263, filed Jan. 13, 1994, and entitled "INFRARED CONTINUOUS ZOOM TELESCOPE USING DIFFRACTIVE OPTICS," which is hereby incorporated by reference.

As shown by FIGS. 2A–C, diffractive surface 42 may be formed on a second side of the zoom focusing lens 36 to control axial color. Specifically, diffractive surface 42 may correct axial color focusing aberrations. Diffractive lens 44 may be positioned between collecting lenses 38 and 40 to control lateral color. Specifically, diffractive lens 44 may correct lateral color focusing aberrations. To keep the cost of the zoom lens assembly 16 down, the diffractive lens 44 may be constructed of an inexpensive polymer material such as that described in commonly assigned U.S. patent application Ser. No. 08/289,404 filed Aug. 12, 1994, which is hereby incorporated by reference.

Although zoom lens assembly 16 includes two diffractive surfaces for color correction, it will be understood by those skilled in the art that a single diffractive surface may be used in accordance with the present invention. A single diffractive surface, however, could not correct color aberrations as well as the pair of diffractive surfaces employed by the zoom lens assembly 16. Additionally, although the diffractive surface 42 is formed on the second side of the zoom focusing lens 36, it will be understood by those skilled in the art that the diffractive surface can be formed on a separate diffractive lens.

Diffractive surface 42 and diffractive lens 44 are designed to correct color in the near infrared waveband or in the far infrared waveband. As previously described, the light frequency of interest by which the diffractive surface is cut by one wavelength is 4 microns for the near infrared band. The light frequency of interest for the far infrared waveband is 10 microns. Accordingly, the diffractive surface 42, and thus zoom focusing lens 36, and diffractive lens 44 may be removably mounted in the lens assembly 16 so they may be removed and replaced with a diffractive surface and diffractive lens for a different infrared waveband. This would allow zoom lens assembly 16 to be switched between the near and far infrared wavebands by exchanging the zoom focusing lens 36 and the diffractive lens 44.

What is claimed is:

1. An infrared zoom lens assembly, comprising:

a focusing zoom component located along an optical axis to receive infrared radiation, the focusing zoom component including:

a first focusing zoom lens which provides both a focusing function and a zoom function, the first focusing zoom lens being located along the optical axis at a first location when said zoom lens assembly is at a first zoom position and when said zoom lens assembly is at a second zoom position different from the first zoom position; and a second focusing zoom lens which provides both a focusing function and a zoom function, the second focusing zoom lens being movably supported in said infrared zoom lens assembly;

a collecting component located along the optical axis and in optical communication with the focusing zoom component, the collecting component including at least one collecting lens; and a diffracting component located along the optical axis and in optical communication with the focusing zoom component and the collecting component, the diffracting component including at least one diffractive surface to correct color aberrations associated with an infrared waveband;

the focusing zoom component and the collecting component cooperating with the diffracting component to focus infrared radiation at an image plane of an infrared detector;

the first focusing zoom lens being movably supported in said infrared zoom lens assembly; and the first focusing zoom lens being located along the optical axis at a second location different from the first location when said zoom lens assembly is between the first and second zoom positions.

2. An infrared zoom lens assembly, comprising:

a focusing zoom component located along an optical axis to receive infrared radiation, the focusing zoom component including:

a first focusing zoom lens which provides both a focusing function and a zoom function, the first focusing zoom lens being located along the optical axis at a first location when said zoom lens assembly is at a first zoom position and when said zoom lens assembly is at a second zoom position different from the first zoom position; and a second focusing zoom lens which provides both a focusing function and a zoom function, the second focusing zoom lens being movably supported in said infrared zoom lens assembly;

a collecting component located along the optical axis and in optical communication with the focusing zoom component, the collecting component including at least one collecting lens;

a diffracting component located along the optical axis and in optical communication with the focusing zoom component and the collecting component, the diffracting component including at least one diffractive surface to correct color aberrations associated with an infrared waveband, and the focusing zoom component and the collecting component cooperating with the diffracting component to focus infrared radiation at an image plane of an infrared detector; and an aperture stop mounted on a movably supported lens, the aperture stop being operable to vary the F/Number of said zoom lens assembly between the first and second zoom positions.

3. The infrared zoom lens assembly of claim 2, wherein said aperture stop is mounted on the second focusing zoom lens.

4. An infrared zoom lens assembly according to claim 2, wherein said first focusing zoom lens is disposed on an object side of said second focusing zoom lens, said first focusing zoom lens being a negative diverging lens and said second focusing zoom lens being a positive converging lens.

5. An infrared zoom lens assembly according to claim 2, wherein said second focusing zoom lens moves away from said first focusing zoom lens when moving from a second location to a third location along the optical axis.

6. An infrared zoom lens assembly according to claim 2, wherein said first focusing zoom lens is stationarily fixed in the first location.

7. An infrared zoom lens assembly according to claim 2, wherein said zoom lens assembly effects a continuous zoom from the first zoom position to the second zoom position, and wherein said first focusing zoom lens is supported for movement along the optical axis within a range of movement which includes the first location.

8. An infrared zoom lens assembly according to claim 7, wherein as said second focusing zoom lens moves from a second location to a third location along the optical axis, said first focusing zoom lens moves away from the first location in a first direction and then moves back to the first location in a second direction opposite the first direction.

9. An infrared zoom lens assembly according to claim 8, wherein said first focusing zoom lens moves toward said second focusing zoom lens when moving in said first direction.

10. An infrared zoom lens assembly according to claim 2, wherein said zoom lens assembly is operative for use in an infrared waveband; and wherein said first and second focusing zoom lenses are each made of a high dispersion, low index material.

11. An infrared zoom lens assembly according to claim 10, wherein said diffractive surface is provided on said second focusing zoom lens.

12. An infrared zoom lens assembly according to claim 2, wherein said collecting component is disposed along the optical axis on a side of said second focusing zoom lens remote from said first focusing zoom lens.

13. An infrared zoom lens assembly according to claim 12, wherein said zoom lens assembly is operative for use in an infrared waveband; wherein said collecting component includes a further collecting lens; and wherein said collecting lenses and said first and second focusing zoom lenses are each made of a high dispersion, low index material.

14. An infrared zoom lens assembly according to claim 13, wherein said collecting lenses and said first and second focusing zoom lenses each have thereon an aspheric surface.

15. An infrared zoom lens assembly according to claim 13, including means for athermalizing said infrared zoom lens assembly.

16. An infrared zoom lens apparatus according to claim 15, wherein said means for athermalizing includes said further collecting lens being supported for movement along said optical axis, and includes a spacer which expands and contracts with temperature and which is cooperable with said further collecting lens for effecting movement thereof.

17. An infrared zoom lens assembly according to claim 2, wherein said first and second zoom positions respectively correspond to a first degree of magnification and a second degree of magnification which are different.

18. An infrared imaging system, comprising:

an infrared detector operative in the near and far infrared wavebands, the infrared detector including an image plane located along an optical axis; and an infrared zoom lens assembly operative in at least one of the near and far infrared wavebands, the infrared zoom lens assembly being in optical communication with the infrared detector and including:

a focusing zoom component located along the optical axis to receive infrared radiation, the focusing zoom component further including:

a first focusing zoom lens which provides both a focusing function and a zoom function, and which is formed from a high dispersion, low index material, the first focusing zoom lens being located along the optical axis at a first location when the zoom lens assembly is at a first zoom position and when the zoom lens assembly is at a second zoom position different from the first zoom position; and a second focusing zoom lens which provides both a focusing function and a zoom function, and which is formed from a high dispersion, low index material, the second focusing zoom lens being movably mounted in the infrared zoom lens assembly;

a collecting component located along the optical axis and in optical communication with the focusing zoom component, the collecting component including at least one collecting lens formed from a high dispersion, low index material; and a diffracting component located along the optical axis and in optical communication with the focusing zoom component and the collecting component, the diffracting component including at least one diffractive surface to correct color aberrations associated with an infrared waveband;

the focusing zoom component and the collecting component cooperating with the diffracting component to focus infrared radiation at the image plane of the infrared detector;

the first focusing zoom lens being movably supported in said infrared zoom lens assembly; and the first focusing zoom lens being located along the optical axis at a second location different from the first location when the zoom lens assembly is between the first and second zoom positions.

19. An infrared imaging system, comprising:

an infrared detector operative in the near and far infrared wavebands, the infrared detector including an image plane located along an optical axis; and an infrared zoom lens assembly operative in at least one of the near and far infrared wavebands, the infrared zoom lens assembly being in optical communication with the infrared detector and including:

a focusing zoom component located along the optical axis to receive infrared radiation, the focusing zoom component further including:

a first focusing zoom lens which provides both a focusing function and a zoom function, and which is formed from a high dispersion, low index material, the first focusing zoom lens being located along the optical axis at a first location when the zoom lens assembly is at a first zoom position and when the zoom lens assembly is at a second zoom position different from the first zoom position; and a second focusing zoom lens which provides both a focusing function and a zoom function, and which is formed from a high dispersion, low index material, the second focusing zoom lens being movably mounted in the infrared zoom lens assembly;

a collecting component located along the optical axis and in optical communication with the focusing zoom component, the collecting component including at least one collecting lens formed from a high dispersion, low index material;

a diffracting component located along the optical axis and in optical communication with the focusing zoom component and the collecting component, the diffracting component including at least one diffractive surface to correct color aberrations associated with an infrared waveband, and the focusing zoom component and the collecting component cooperating with the diffracting component to focus infrared radiation at the image plane of the infrared detector; and an aperture stop mounted on a movably supported lens, the aperture stop being operable to vary the F/Number of said zoom lens assembly between zoom positions.

20. The infrared imaging system of claim 19, wherein said aperture stop is mounted on the second focusing zoom lens.

* * * * *

UNITED STATES PATENT AND TRADEMARK OFFICE
CERTIFICATE OF CORRECTION

PATENT NO. : 5,852,516
DATED : December 22, 1998
INVENTOR(S) : Chipper

It is certified that error appears in the above-identified patent and that said Letters Patent is hereby corrected as shown below:

Cover page, column 1, under "References Cited" [56], delete "4,143,402" and insert --4,143,269--;

Column 8, line 52, after "(CC)", insert --*--.

Signed and Sealed this

Third Day of August, 1999

Attest:

Attesting Officer

Q. TODD DICKINSON

Acting Commissioner of Patents and Trademarks